(12) United States Patent
Simpson et al.

(10) Patent No.: US 9,221,076 B2
(45) Date of Patent: Dec. 29, 2015

(54) COMPOSITION FOR FORMING AN OPTICALLY TRANSPARENT, SUPERHYDROPHOBIC COATING

(75) Inventors: John T. Simpson, Clinton, TN (US); Linda A. Lewis, Andersonville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 474 days.

(21) Appl. No.: 12/938,044

(22) Filed: Nov. 2, 2010

(65) Prior Publication Data

US 2012/0107581 A1 May 3, 2012

(51) Int. Cl.
| | |
|---|---|
| *B32B 3/10* | (2006.01) |
| *B05D 5/08* | (2006.01) |
| *C09D 5/16* | (2006.01) |
| *C09D 7/12* | (2006.01) |
| *C09D 175/04* | (2006.01) |
| *B32B 5/16* | (2006.01) |
| *C08K 9/06* | (2006.01) |

(52) U.S. Cl.
CPC ... *B05D 5/08* (2013.01); *B32B 3/10* (2013.01); *B32B 5/16* (2013.01); *C09D 5/1681* (2013.01); *C09D 7/1225* (2013.01); *C09D 7/1266* (2013.01); *C09D 175/04* (2013.01); *B32B 2264/102* (2013.01); *B32B 2307/412* (2013.01); *C08K 9/06* (2013.01); *Y10T 428/24868* (2015.01)

(58) Field of Classification Search
None
See application file for complete search history.

(56) References Cited

U.S. PATENT DOCUMENTS

| | | |
|---|---|---|
| 3,931,428 A | 1/1976 | Reick |
| 4,326,509 A | 4/1982 | Usukura |
| | (Continued) | |

FOREIGN PATENT DOCUMENTS

| | | |
|---|---|---|
| CN | 101225226 | 7/2008 |
| DE | 19740964 | 3/1999 |
| | (Continued) | |

OTHER PUBLICATIONS

Arkles, B., "Hydrophobicity, Hydrophilicity and Silane Surface Modification," Gelest, Inc., copyright 2006, pp. 1-19.

(Continued)

*Primary Examiner* — Gerard Higgins
*Assistant Examiner* — Sathavaram I Reddy
(74) *Attorney, Agent, or Firm* — Novak Druce Connolly Bove + Quigg LLP

(57) ABSTRACT

A composition for producing an optically clear, well bonded superhydrophobic coating includes a plurality of hydrophobic particles comprising an average particle size of about 200 nm or less, a binder at a binder concentration of from about 0.1 wt. % to about 0.5 wt. %, and a solvent. The hydrophobic particles may be present in the composition at a particle concentration of from about 0.1 wt. % to about 1 wt. %. An optically transparent, superhydrophobic surface includes a substrate, a plurality of hydrophobic particles having an average particle size of about 200 nm or less dispersed over the substrate, and a discontinuous binder layer bonding the hydrophobic particles to the substrate, where the hydrophobic particles and the binder layer form an optically transparent, superhydrophobic coating.

10 Claims, 2 Drawing Sheets

(56) References Cited

U.S. PATENT DOCUMENTS

| | | |
|---|---|---|
| 4,829,093 A | 5/1989 | Matsukawa et al. |
| 5,086,764 A | 2/1992 | Gilman |
| 5,096,882 A | 3/1992 | Kato et al. |
| 5,154,928 A | 10/1992 | Andrews |
| 5,164,363 A | 11/1992 | Eguchi et al. |
| 5,180,845 A | 1/1993 | Higley |
| 5,215,635 A | 6/1993 | Stein et al. |
| 5,258,221 A | 11/1993 | Meirowitz et al. |
| 5,266,558 A | 11/1993 | Lichtenberg et al. |
| 5,432,151 A | 7/1995 | Russo et al. |
| 5,510,323 A | 4/1996 | Kamo et al. |
| 5,543,630 A | 8/1996 | Bliss et al. |
| 5,650,378 A | 7/1997 | Iijima et al. |
| 5,736,249 A | 4/1998 | Smith et al. |
| 5,739,086 A | 4/1998 | Goyal et al. |
| 5,741,377 A | 4/1998 | Goyal et al. |
| 5,753,735 A | 5/1998 | Okoroafor et al. |
| 5,801,105 A | 9/1998 | Yano et al. |
| 5,846,912 A | 12/1998 | Selvamanickam et al. |
| 5,872,080 A | 2/1999 | Arendt et al. |
| 5,898,020 A | 4/1999 | Goyal et al. |
| 5,958,599 A | 9/1999 | Goyal et al. |
| 5,964,966 A | 10/1999 | Goyal et al. |
| 5,968,877 A | 10/1999 | Budai et al. |
| 6,040,251 A | 3/2000 | Caldwell |
| 6,074,990 A | 6/2000 | Pique et al. |
| 6,077,344 A | 6/2000 | Shoup et al. |
| 6,106,615 A | 8/2000 | Goyal et al. |
| 6,114,287 A | 9/2000 | Lee et al. |
| 6,147,033 A | 11/2000 | Youm |
| 6,150,034 A | 11/2000 | Paranthaman et al. |
| 6,151,610 A | 11/2000 | Senn et al. |
| 6,154,599 A | 11/2000 | Rey |
| 6,156,376 A | 12/2000 | Paranthaman et al. |
| 6,159,610 A | 12/2000 | Paranthaman et al. |
| 6,180,570 B1 | 1/2001 | Goyal et al. |
| 6,190,752 B1 | 2/2001 | Do et al. |
| 6,214,772 B1 | 4/2001 | Iijima et al. |
| 6,231,779 B1 | 5/2001 | Chiang et al. |
| 6,235,402 B1 | 5/2001 | Shoup et al. |
| 6,261,704 B1 | 7/2001 | Paranthaman et al. |
| 6,265,353 B1 | 7/2001 | Kinder et al. |
| 6,270,908 B1 | 8/2001 | Williams et al. |
| 6,331,199 B1 | 12/2001 | Goyal et al. |
| 6,331,329 B1 | 12/2001 | McCarthy et al. |
| 6,361,598 B1 | 3/2002 | Balachandran et al. |
| 6,375,768 B1 | 4/2002 | Goyal |
| 6,384,293 B1 | 5/2002 | Marcussen |
| 6,399,154 B1 | 6/2002 | Williams et al. |
| 6,440,211 B1 | 8/2002 | Beach et al. |
| 6,447,714 B1 | 9/2002 | Goyal et al. |
| 6,451,450 B1 | 9/2002 | Goyal et al. |
| 6,468,591 B1 | 10/2002 | Paranthaman et al. |
| 6,486,100 B1 | 11/2002 | Lee et al. |
| 6,515,066 B2 | 2/2003 | Allen et al. |
| 6,537,689 B2 | 3/2003 | Schoop et al. |
| 6,555,256 B1 | 4/2003 | Christen et al. |
| 6,599,346 B2 | 7/2003 | Goyal et al. |
| 6,602,313 B2 | 8/2003 | Goyal et al. |
| 6,607,313 B1 | 8/2003 | Farries et al. |
| 6,607,838 B2 | 8/2003 | Goyal et al. |
| 6,607,839 B2 | 8/2003 | Goyal et al. |
| 6,610,413 B2 | 8/2003 | Goyal et al. |
| 6,610,414 B2 | 8/2003 | Goyal et al. |
| 6,632,539 B1 | 10/2003 | Iijima et al. |
| 6,635,097 B2 | 10/2003 | Goyal et al. |
| 6,645,313 B2 | 11/2003 | Goyal et al. |
| 6,657,229 B1 | 12/2003 | Eguchi et al. |
| 6,663,976 B2 | 12/2003 | Beach et al. |
| 6,670,308 B2 | 12/2003 | Goyal |
| 6,673,646 B2 | 1/2004 | Droopad |
| 6,716,795 B2 | 4/2004 | Norton et al. |
| 6,740,421 B1 | 5/2004 | Goyal |
| 6,756,139 B2 | 6/2004 | Jia et al. |
| 6,764,770 B2 | 7/2004 | Paranthaman |
| 6,782,988 B2 | 8/2004 | Canacuzene et al. |
| 6,784,139 B1 | 8/2004 | Sankar et al. |
| 6,790,253 B2 | 9/2004 | Goyal et al. |
| 6,797,030 B2 | 9/2004 | Goyal et al. |
| 6,833,186 B2 | 12/2004 | Perrine et al. |
| 6,846,344 B2 | 1/2005 | Goyal et al. |
| 6,867,447 B2 | 3/2005 | Summerfelt |
| 6,872,988 B1 | 3/2005 | Goyal |
| 6,884,527 B2 | 4/2005 | Groves et al. |
| 6,890,369 B2 | 5/2005 | Goyal et al. |
| 6,899,928 B1 | 5/2005 | Groves et al. |
| 6,902,600 B2 | 6/2005 | Goyal et al. |
| 6,916,301 B1 | 7/2005 | Clare |
| 6,921,741 B2 | 7/2005 | Arendt et al. |
| 6,956,012 B2 | 10/2005 | Paranthaman et al. |
| 6,983,093 B2 | 1/2006 | Fraval et al. |
| 6,984,857 B2 | 1/2006 | Udayakumar et al. |
| 6,989,123 B2 | 1/2006 | Lee et al. |
| 7,020,899 B1 | 4/2006 | Carlopio |
| 7,087,113 B2 | 8/2006 | Goyal |
| 7,090,785 B2 | 8/2006 | Chiang et al. |
| 7,193,015 B1 | 3/2007 | Mabry et al. |
| 7,208,044 B2 | 4/2007 | Zurbuchen et al. |
| 7,258,731 B2 | 8/2007 | D'Urso |
| 7,265,256 B2 | 9/2007 | Artenstein |
| 7,267,881 B2 | 9/2007 | Weberg et al. |
| 7,323,581 B1 | 1/2008 | Gardiner et al. |
| 7,338,907 B2 | 3/2008 | Li et al. |
| 7,341,978 B2 | 3/2008 | Gu et al. |
| 7,485,343 B1 | 2/2009 | Branson et al. |
| 7,553,799 B2 | 6/2009 | Paranthaman et al. |
| 7,642,309 B2 | 1/2010 | Tarng et al. |
| 7,754,279 B2 | 7/2010 | Simpson et al. |
| 7,879,161 B2 | 2/2011 | Goyal |
| 8,216,674 B2 | 7/2012 | Simpson et al. |
| 2003/0013795 A1 | 1/2003 | Nun et al. |
| 2003/0114818 A1* | 6/2003 | Benecke et al. ............... 604/378 |
| 2003/0185741 A1 | 10/2003 | Matyjaszewski et al. |
| 2004/0003768 A1 | 1/2004 | Goyal |
| 2004/0095658 A1 | 5/2004 | Buretea et al. |
| 2005/0129962 A1 | 6/2005 | Amidaiji et al. |
| 2005/0239658 A1 | 10/2005 | Paranthaman et al. |
| 2005/0239659 A1 | 10/2005 | Xiong et al. |
| 2006/0019114 A1 | 1/2006 | Thies et al. |
| 2006/0110542 A1 | 5/2006 | Dietz et al. |
| 2006/0111249 A1 | 5/2006 | Shinohara |
| 2006/0234066 A1 | 10/2006 | Zurbuchen |
| 2006/0263516 A1 | 11/2006 | Jones et al. |
| 2006/0276344 A1 | 12/2006 | Paranthaman et al. |
| 2006/0288774 A1 | 12/2006 | Jacob et al. |
| 2007/0009657 A1 | 1/2007 | Zhang et al. |
| 2007/0027232 A1 | 2/2007 | Walsh, Jr. et al. |
| 2007/0098806 A1 | 5/2007 | Ismail et al. |
| 2007/0166464 A1 | 7/2007 | Acatay et al. |
| 2007/0170393 A1 | 7/2007 | Zhang |
| 2007/0178227 A1 | 8/2007 | Hunt et al. |
| 2007/0298216 A1 | 12/2007 | Jing et al. |
| 2008/0004691 A1 | 1/2008 | Weber |
| 2008/0015298 A1* | 1/2008 | Xiong et al. ................... 524/432 |
| 2008/0176749 A1 | 7/2008 | Goyal |
| 2008/0241581 A1 | 10/2008 | Zurbuchen et al. |
| 2008/0268288 A1 | 10/2008 | Jin |
| 2008/0286556 A1 | 11/2008 | D'urso et al. |
| 2008/0299288 A1 | 12/2008 | Kobrin et al. |
| 2009/0018249 A1 | 1/2009 | Kanagasabapathy et al. |
| 2009/0042469 A1 | 2/2009 | Simpson |
| 2009/0076430 A1* | 3/2009 | Simpson et al. ................ 602/42 |
| 2009/0081456 A1 | 3/2009 | Goyal |
| 2009/0088325 A1 | 4/2009 | Goyal et al. |
| 2009/0136741 A1* | 5/2009 | Zhang et al. ................... 428/328 |
| 2010/0004373 A1 | 1/2010 | Zhu et al. |
| 2010/0021745 A1 | 1/2010 | Simpson et al. |
| 2012/0088066 A1 | 4/2012 | Aytug et al. |

FOREIGN PATENT DOCUMENTS

| | | |
|---|---|---|
| EP | 0718897 | 6/1996 |
| JP | 1065718 | 3/1987 |
| JP | 1100816 | 4/1989 |

(56) References Cited

FOREIGN PATENT DOCUMENTS

| | | |
|---|---|---|
| JP | 1100817 | 4/1989 |
| JP | 1220307 | 9/1989 |
| JP | 11025772 | 1/1999 |
| JP | 2003286196 | 10/2003 |
| RU | 2008136478 | 3/2010 |
| WO | WO 2008108606 | 9/2008 |
| WO | WO 2010089833 | 5/2010 |

OTHER PUBLICATIONS

Poco, J. F. et al., "Synthesis of High Porosity, Monolithic Alumina Aerogels," 6th International Symposium on Aerogels, Albuquerque, NM, Oct. 8-11, 2000, 13 pages.

Smirnova, I., "Synthesis of Silica Aerogels and Their Application as a Drug Delivery System," Dissertation, Technischen Universität Berlin, 2002, Berlin, Germany pp. 43-44.

Ahn et al., "Heterogeneous Three-Dimensional Electronics by Use of Printed Semiconductor Nanomaterials," Science vol. 314, (2006) pp. 1754-1757.

Aytug et al., "Enhanced flux pinning in MOCVD-YBCO films through Zr additions: systematic feasibility studies," Superconductor Science and Technology, vol. 23, (2010), pp. 1-7.

Aytug et al., "Enhancement of Flux Pinning in $YBa_2Cu_3O_{7-\delta}$ Films via Nano-Scale Modifications of Substrate Surfaces," Oak Ridge National Laboratory, Oak Ridge, TN 37831, ISBN: 978-1-60021-692-3, pp. 237-262.

Aytug et al., "ORNL-Superpower CRADA: Development of MOCVD-based IBAD-2G wires" 2008, Retrieved from URL: http://111.htspeereview.com /2008/pdfs/presentations/wednesday/2G/5_2g_ornl_superpower.pdf [retrieved on Oct. 21, 2010].

Aytug, "Deposition studies and coordinated characterization of MOCVD YBCO films on IBAD-MgO templates," Superconductor Science and Technology, vol. 22, (2009) p. 1.

Chen et al., "Metal Organic Chemical Vapor Deposition for the Fabrication of YBCO Superconducting Tapes," SuperPower Inc., Schenectady, NY 12304, ISBN: 978-1-60021-692-1, pp. 205-216.

Comini et al., "Quasi-one dimensional metal oxide semiconductors: Preparation, characterization and application as chemical sensors," Progress in Materials Science, vol. 54, No. 1 (2009) pp. 1-67.

Das et al., Novel nonlithographie quantum wire array fabrication; Physica E—Low-Dimensional Systems and Nanostructures, Elsevier Science BV, NL LNKD-DOI: 10.1016/J.Physe.2005, 10.015, vol. 36, No. 2, 3 (2007), pp. 133-139.

Duan et al., "Indium phosphide nanowires as building blocks for nanoscale electronic and optoelectronic devices," Optoelectronic Devices, Nature, vol. 409, (2001) pp. 66-69.

Feng et al., "A Super-hydrophobic and super-oleophilic coating mesh film for the separation of oil and water," Angew. Chem. Int. Ed. (2004) 43: 2012-2014.

Gao, et al., Single and Binary Rare Earth $REBa_2Cu_3O_{7-\delta}$ Thin Films Prepared by Chemical Solution Deposition, J. Phys. Conf. Series, vol. 97, (2008) pp. 1-5.

Goyal et al., "Irradiation-free, columnar defects comprised of self-assembled nanodots and nanorods resulting in strongly enhanced flux-pinning in $YBa_2Cu_3O_{7-\delta}$ films," Superconductor Science and Technology, vol. 18, No. 11, (2005) pp. 1533-1538.

Goyal et al., "Self-assembled, ferromagnetic Co/YSZ nanocomposite films for ultrahigh density storage media," Abstract Submitted.

Han et al., "Transition Metal Oxide Core-Shell Nanowires: Generic Synthesis and Transport Studies," Nano Letters, vol. 4, No. 7, (2004) pp. 1241-1246.

Harrington et al., "Self-assembled, rare earth tantalite pyrochlore nanoparticles for superior flux pinning in $YBa_2Cu_3O_{7-\delta}$ films," Superconductor Science and Technology, Issue 2 (2009), pp. 1-5.

Haugan et al., "In-Situ Approach to Introduce Flux Pinning in YBCO," Air Force Research Laboratory, ISBN: 978-1-60021-692-3, pp. 59-77.

Hikichi et al., "Property and Structure of $YBa_2Cu_3O_{7-\delta}$-$Nb_2O_5$ Composite," Journal of Applied Physics, vol. 31, (1992) L1234, col. 2 Paragraph 1.

Huang et al., "Room-Temperature Ultraviolet Nanowire Nanolasers," Science, 292, (2001) pp. 1897-1899.

Javey et al., "Layer-by-Layer Assembly of Nanowires fore Three-Dimensional, Multifunctional Electronics" Nano Letters, vol. 7, No. 3 (2007) pp. 773-777.

Kang et al., "High-Performance High-$T_c$ Superconducting Wires," Science, DOI:10.1126/Science.1124872, vol. 331, No. 31 (2006), pp. 1911-SOM.

Kang et al., "Supporting material: High-performance H-$T_c$ Superconducting Wires," Science, vol. 331 (2006) 2 pp., col. 1. paragraph 3.

Kar et al., "Synthesis and Characterization of One-dimensional MgO Nanostructures," Nanosci. Nanotech, vol. 314, (2006) pp. 1447-1452.

Kita et al., "Effect of $Ta_2O_5$ addition on the superconducting properties of $REBa_2CU_3O_y$," Physica C; vol. 445-448, (2006) pp. 391-394.

Kuchibhatla et al., "One dimensional nanostructured materials," Progress in Materials Science, Pergamon Press, GB-LNKD DOI: 10.1016/J.Pmatsci.2006.08.001, vol. 52, No. 5 (2007) pp. 699-913.

Le et al., Systematic studies of the epitaxial growth of single-crystal ZnO nanorods on GaN using hydrothermal synthesis,: Journal of Crystal Growth, Elsevier, Amsterdam, NL LNKD-DOI:10.1016/J.Jerysgro.2006.04.082, vol. 293, No. 1 (2006) pp. 36-42.

Lei et al., "Highly ordered nanostructures with tunable size, shape and properties: A new way to surface non-pattering using ultra-thin alumina masks," Progress in Materials Science, Pergamon Press, GB LNKD-D0I: 10.1016/J.Pmatsci.2006.07.002, vol. 52, No. 4 (2007) pp. 465-539.

Levkin et al., "Porous polymer coatings: A versatile approach to Superhydrophobic surfaces," Adv. Funct. Mater. (2009) 19: 1993-1998.

Li and Zhu, "Preparation and structure characterization of organic-inorganic nareocomposites," J Xi'an Shiyou Univ. (Natural Sci. Ed.) (2003). (abstract only).

Li et al., "Joining of pressureless sintered SiC using polysiloxane SR355 with active additive Ni nanopowder," Acta Materiae Composite Sinica, (2008). Abstract only.

Liang et al., "Preparation of Free-Standing Nanowire Arrays on Conductive Substrates," J. Am. Chem. Soc. vol. 126 (2004) pp. 16338-16339.

Lu et al., "Quasi-one-dimensional metal oxide materials-Synthesis, properties and applications," Materials Science and Engineering R: Reports, Elsevier Sequoia S.A., Lausanne, CH LNKD-DOI:10.1016/J.Mser.2006.04.002, vol. 52, No. 103, (2006) pp. 49-91.

Ma et al., "Growth and properties or YBCO-coated conductors fabricated by inclined-substrate deposition," IEE Transactions on Applied Superconductivity, vol. 15, No. 2 (2005) pp. 2970-2973.

McIntyre et al., "Metalorganic deposition of high-$J_c$$Ba_2YCu_3O_{7-x}$ thin films from trifluoroacetate precursos onto (100) $SrTiO_3$," Journal of Applied Physics, vol. 68, No. 8 (1990) pp. 4183-4187.

Morales et al. "A laser Ablation Method for the Synthesis of Crystalline Semiconductor Nanowires," Science, vol. 279 (1998) pp. 208-211.

Nagashima et al., "Epitaxial Growth of MgO Nanowires by Pulsed Laser Deposition," J. Appl. Phys., vol. 101 (2007) pp. 124304-1 to 124304-4.

Pan et al., "Nanobelts of Semiconducting Oxides," Science, vol. 291, (2001) pp. 1947-1949.

Paranthaman et al., "Flux Pinning and AC Loss in Second Generation High Temperature Superconductor Wires," Oak Ridge National Laboratory, Oak Ridge, TN 37832, ISBN: 978-1-60021-692-3, pp. 3-10.

Pomar et al., "Enhanced vortex pinning in YBCO coated conductors with BZO nanoparticleis from chemical solution deposition," IEEE Transactions on Applied Superconductivity, vol. 19, No. 3, (2009) pp. 3258-3261.

Saylor et al., "Experimental Method for Determining surface Energy Anisotropy and its Application to Magnesia," Journal of the American Ceramic Society, vol. 83, No. 5, (2004) pp. 1226-1232.

(56) References Cited

OTHER PUBLICATIONS

Selvamanickam et al., "High-current Y-Ba-Cu-O coated conductor using metal organic chemical-vapor Deposition, and ion-beam-assisted deposition," IEEE Transactions on Applied Superconductivity, vol. 11, No. 1 (2001) pp. 3379-3381.

Su et al., "Fabrication of thin films of multi-oxides ($YBa_2Cu_3O_{7-\delta}$) starting from nanoparticles of mixed ions," Superconductor Science and Technology, vol. 19, No. 11, (2006) pp. L51-L54.

Tu et al., "Fabrication of Superhydrophobic and Superoleophilic polystyrene surfaces by a facile one step method," Macromol. Rapid Commun. (2007) 28: 2262-2266.

Wang et al., "Growth of Nanowires," Mater. Sci. & Eng., vol. 60, No. 1-6 (2008) pp. 1-51.

Wee et al., "Enhanced flux pinning and critical current density via incorporation of self-assembled rare-earth barium tantalite nanocolumns with $YBa_2Cu_3O_{7-\delta}$ films," Physical Review B., vol. 81, No. 14 (2010) pp. 140503/1-14053/2.

Wee et al., "Formation of Self-Assembled, Double Perovskite, $Ba_2YNbO_6$ Nanocolumns and Their Contribution to Flux-Pinning and $J_o$ in Nb-Doped $YBa_2Cu_3O_{7-\delta}$ Films," Applied Physics Express, vol. 3, Issue 2, (2010) pp. 023101-023101-3.

Wee et al., "High Performance Superconducting Wire in High Applied Magnetic Fields via Nanoscale Defect Engineering," Superconductor Science and Technology, (2008) pp. 1-4.

Wei et al., "Preparation and characterization of periodic mesoporous organosilica ermially functionalized with fluorocarbon groups by a direct synthesis," J Sol-Gel Sci Technol (2007) 44: 105-110.

Yamada et al., "Towards the practical PLD-IBAD coated conductor fabrication—Long wire, high production rate and $J_c$ enhancement in a magnetic field," Physica C: vol. 445-448 (2006) pp. 504-508.

Yamada et al., Reel-to-Reel Pulsed Laser Deposition of YBCO Thick Films, Nagoya Coated Conductor Center, Superconductivity Research Laboratory, ISTEC, 2-4-1, Mutsuno, Atsuta-ku, Nagoya, 456,-8587-Japan.

Yoo et al., "Eiectrocatalytic application of a vertical Au nanorod array using ultrathin Pt/Ru/Pt layer-by-layer coatings," Electrochimica ACTA, vol. 53, No. 1-3 (2007) pp. 3656-3662.

\* cited by examiner

COMPOSITION FOR FORMING AN OPTICALLY TRANSPARENT, SUPERHYDROPHOBIC COATING

FEDERALLY SPONSORED RESEARCH OR DEVELOPMENT

This invention was made with government support under Contract No. DE-AC05-000R22725 awarded by the Department of Energy. The government has certain rights in this invention.

TECHNICAL FIELD

The present disclosure is directed generally to superhydrophobic surfaces and more particularly to a composition for forming an optically transparent, superhydrophobic coating on a substrate.

BACKGROUND

A superhydrophobic surface is a highly water-repellent surface characterized by a resistance to wetting and high water droplet contact angles. FIG. 1 shows a water droplet having a contact angle of θ on an exemplary surface. Surfaces with water droplet contact angles in excess of 90 degrees are generally considered to be hydrophobic. On a smooth surface, a water droplet can theoretically reach a maximum contact angle of 120 degrees. If the apparent water droplet contact angle exceeds 150 degrees, as may occur when a surface includes microscale asperities, the surface may be said to be superhydrophobic. Superhydrophobicity may be referred to as the "lotus leaf effect" given its origins in nature.

The surface of a lotus leaf is covered with countless microscopic protrusions coated with a waxy layer. This waxy layer acts as a multifunctional interface between the leaf and its environment, influencing airflow and light reflection, and imparting, along with the protrusions, very high water repellency to the surface of the leaf. Water falling on the leaf rolls over the surface as small droplets. The hydrophobic topographical microfeatures minimize the area of contact between a water droplet and the leaf surface, thereby keeping the droplet in contact mainly with the surrounding air. As a result, the water on the leaf surface substantially retains the droplet shape it would have in the air. The rough, waxy microstructures present on the lotus leaf result in contact angles as high as 170°, thereby imparting to the surface enhanced superhydrophobic properties.

Surfaces may be roughened, patterned, or otherwise processed to obtain the microscale features deemed advantageous for superhydrophobicity. Superhydrophobic coatings may also be formed on a hydrophilic surface to impart superhydrophobic characteristics to the surface. For example, superhydrophobic coatings can be produced on glass to form windows with self-cleaning capabilities. Challenges remain, however, in producing coatings that are well-bonded to the underlying surface and which exhibit both excellent superhydrophobic properties and optical transparency.

BRIEF SUMMARY

An improved composition for producing an optically clear, superhydrophobic coating that may be securely bonded to a substrate is described herein. An optically transparent, superhydrophobic surface and a method of fabricating such a surface are also described.

The composition includes a plurality of hydrophobic particles comprising an average particle size of about 200 nm or less, a binder at a binder concentration of from about 0.1 wt. % to about 0.5 wt. %, and a solvent. The hydrophobic particles may be present in the composition at a particle concentration of from about 0.1 wt. % to about 1 wt. %.

The superhydrophobic surface includes a substrate, a plurality of hydrophobic particles having an average particle size of about 200 nm or less dispersed over the substrate, and a discontinuous binder layer bonding the hydrophobic particles to the substrate, where the hydrophobic particles and the binder layer form an optically transparent, superhydrophobic coating.

The method of making a transparent superhydrophobic coating includes depositing a coating formulation onto a substrate, where the coating formulation includes a solvent, a binder, and a plurality of hydrophobic particles comprising an average particle size of about 200 nm or less; removing the solvent from the substrate; forming a discontinuous layer of the binder on the substrate, where the binder migrates to interfacial regions between the hydrophobic particles and the substrate as the solvent is removed; and bonding the hydrophobic particles to the substrate at the interfacial regions, thereby forming a transparent superhydrophobic coating on the substrate.

DETAILED DESCRIPTION

A particle-based superhydrophobic coating that may be well-bonded to a surface without sacrificing hydrophobicity or optical clarity is described. As used in the present disclosure, "optically transparent" coatings transmit at least about 90% of incident light having a wavelength in the range of 300 nm to 1500 nm. Advantageously, transmission of visible and infrared light (300-1500 nm) through an optically transparent coating may be about 95% or greater. "Superhydrophobic" is used in the present disclosure to describe surfaces or coatings that have a water contact angle of at least about 150°. In some cases, the superhydrophobic surfaces or coatings may have a water contact angle of at least about 165°, or at least about 175°.

"Hydrophobic" particles are particles having a high specific surface area of at least about 100 m$^2$/g.

Figure 1:
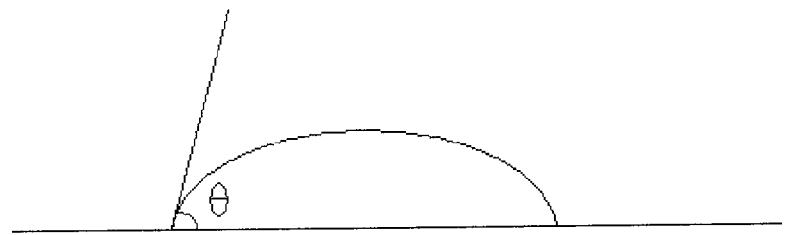
FIG. 1 is a schematic showing the contact angle θ of a droplet of water on a surface.
Figure 2:
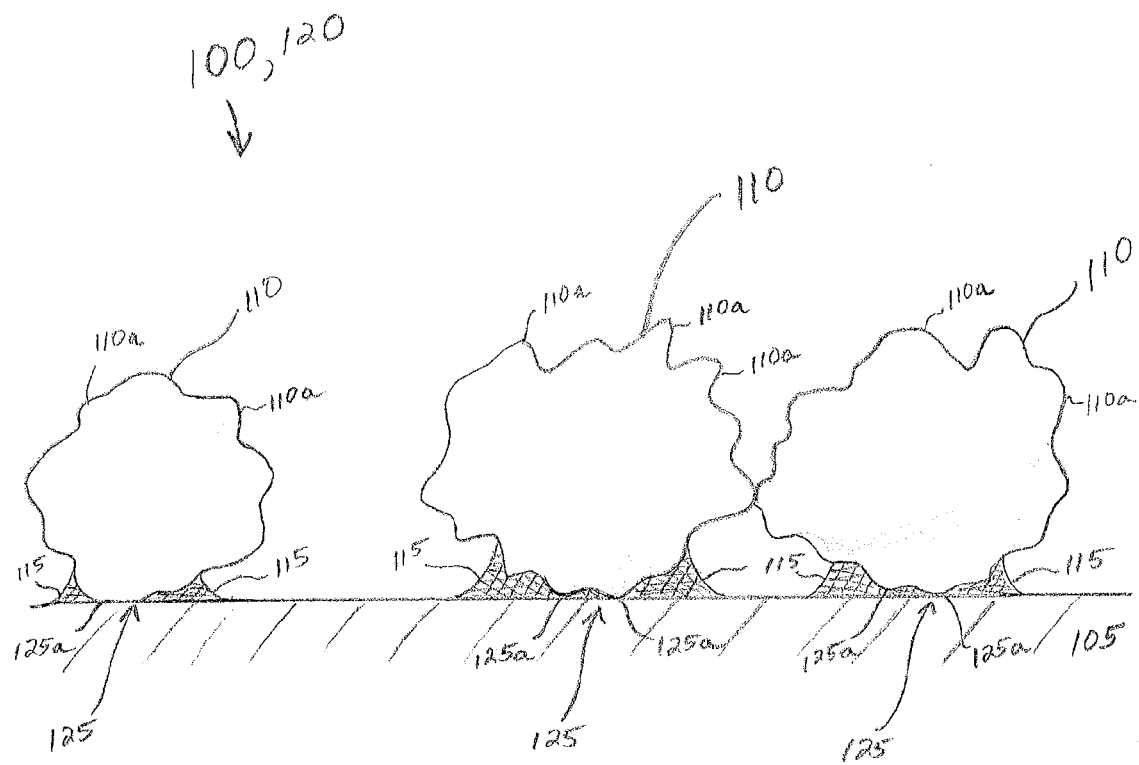
FIG. 2 is a schematic showing a cross-sectional view of an optically transparent, superhydrophobic surface according to one embodiment.

Referring to FIG. 2, an optically transparent, superhydrophobic surface 100 according to the present disclosure may include a substrate 105, a plurality of hydrophobic particles 110 having an average particle size of about 200 nm or less dispersed over the substrate 105, and a discontinuous binder layer 115 bonding the hydrophobic particles 110 to the substrate 105. The hydrophobic particles 110 and the discontinuous binder layer 115 form an optically transparent, superhydrophobic coating 120 on the substrate. As shown schematically in the figure, the hydrophobic particles 110 on the substrate 105 may have a particle surface texture defined by nanoscale asperities 110a that can enhance the hydrophobicity of the surface 100.

The discontinuous binder layer 115 includes discrete binder portions that are localized at interfacial regions 125 between the particles 110 and the substrate 105 and are substantially absent from other regions of the substrate 105. The interfacial regions 125 may include points of contact 125a between the hydrophobic particles 110 and the substrate 105. The binder layer 115 may be driven to the interfacial regions 125 by capillary forces during processing, as discussed further below. Having the binder layer 115 localized at these interfacial regions 125 as opposed to blanketing the substrate 105 (and covering the some or all of the particles) can be advantageous for enhancing and/or preserving the hydrophobicity and optical transparency of the surface 100. Preferably, the maximum thickness of the binder layer 115 on the substrate 105 is less than the average particle size of the hydrophobic particles 110. For example, to avoid swamping the particles 110 and their nanostructured features 110a, the maximum thickness of the binder layer may be less than about 50% of the average particle size of the hydrophobic particles 110, or less than about 25% of the average particle size.

The superhydrophobicity of the surface 100 is enhanced at higher particle densities over the surface. However, if the particles 110 are clumped together or agglomerated, clouding of the coating 120 may occur. Ideally, the particles 110 are dispersed over the substrate 105 in a single layer with a particle surface coverage of at least about 60%. Preferably, the surface coverage is at least about 80%. For optimal fluid (e.g., water) repellency, it may be advantageous for the hydrophobic particles 110 to form a substantially continuous particle layer over the substrate 105, where each particle 110 on the substrate 105 is in direct contact with one or more adjacent particles 110. In some embodiments, each particle may be in contact with substantially all adjacent particles, thereby achieving a particle surface coverage of about 100%.

A coating composition that may be employed to form such an optically transparent, superhydrophobic coating includes a plurality of hydrophobic particles having an average particle size of about 200 nm or less, a binder at a binder concentration of from about 0.1 wt. % to about 0.5 wt. %, and a solvent. Advantageously, the hydrophobic particles are present in the coating composition at a particle concentration of from about 0.1 wt. % to about 1 wt. % to obtain the desired particle surface coverage. The inventors have found that particle concentrations as low as 0.1% may be effective when the particle sizes are very small (e.g., less than about 100 nm) and uniformly distributed. For example, a particle concentration of from about 0.2 wt. % to about 0.4 wt. % may work well in these cases. When the particle size is larger, the particle concentration may lie between about 0.5 wt. % and about 1 wt. %.

To form the superhydrophobic coating, a coating composition such as that described above may be prepared and deposited onto a substrate. Upon removal of the solvent from the substrate, the binder migrates to interfacial regions between the hydrophobic particles and the substrate, forming a discontinuous layer 115 of the binder on the substrate 105, as shown schematically in FIG. 2. The hydrophobic particles 110 are bonded to the substrate at the interfacial regions 125, thereby forming a transparent superhydrophobic coating 120 on the substrate 105.

To ensure the optical clarity of the resultant film, it is important to prepare a coating composition including well-dispersed, fine particles and to keep the particles dispersed throughout the deposition process. Particles that are too large or poorly dispersed can lead to clouding of the superhydrophobic surface. Powder dispersal may be facilitated by using a suitable dispersant and/or solvent during processing of the powder and application to the substrate. Advantageously, the solvent acts as a dispersive agent. For example, a fluorinated solvent such as 3M's Fluorinert™ FC-40 (perfluorotri-n-butylamine mixt. with perfluoro-n-dibutylmethylamine) or FC-75 (perfluoro(2-butyl-tetrahydrofurane) may be used as both a solvent and dispersant. Acetone or propyl-acetate may also be employed.

Suitable hydrophobic particles are generally high surface area, nanostructured and/or nanoporous particles of about 200 nm in average particle size or less. The average particle size represents an average linear dimension of the particles (e.g., an average diameter in the case of substantially spherical particles), and it may represent an average grain or crystallite size, or, in the case of agglomerated particles, an average agglomerate size. Advantageously, the average particle size may be less than about 100 nm, less than about 75 nm, or less than about 50 nm. However, extremely small particles (e.g., a few nanometers or less) may be prohibitively difficult to disperse. Typically, the average particle size lies between about 10 nm and 200 nm, or between about 25 nm and 100 nm. In one example, the average particles size lies between about 40 nm and 60 nm.

The hydrophobic particles may be obtained from a precursor powder of a fairly large starting particle size (e.g., from a few microns to a few millimeters) that is processed to reduce the average particle size to about 200 nm or smaller. A small percentage (e.g., about 0.11% by weight) of the precursor powder may be added to a solvent, and the powder-solvent mixture may be milled, sonicated, or otherwise agitated to break up and disperse the particles within the solvent to form a coating solution. For example, a high power ultrasonic probe may be employed to sonicate the solution for at least about 20 minutes. Longer sonication times (e.g., about 1-5 hours) may be employed to further reduce the size of the particles. After sonication, the coating solution may include fine particles having an average particle size as described above, and a desired amount of a bonding agent may be added.

The hydrophobic particles may include nanoscale surface asperities, i.e., a nanoscale surface texture characterized by protruding or sharp features separated by recessed features and/or pores at the particle surface. Coating compositions including particles with such nanoscale surface asperities may yield coatings with higher water contact angles and thus enhanced hydrophobicity. As one of ordinary skill in the art would recognize, the scale of the surface texture is smaller than the average size of the particle; generally, surface asperities are at least about 50% smaller. For example, hydrophobic particles of about 100 nm in average particle size may include surface asperities of about 50 nm in average size or less, and hydrophobic particles of about 50 nm in average particle size may include surface asperities of about 25 nm in size or less.

A bonding agent or binder is employed in the coating solution to secure the hydrophobic particles to a substrate surface; however, if not selected properly or if employed in the wrong amount, the bonding agent may inhibit the optical clarity of the coating, change the particle surface chemistry from hydrophobic to hydrophilic, or swamp the particle's nanostructured features, thereby diminishing the hydrophobicity of the coating. Binders that are optically clear upon drying (even at larger coating thicknesses) are preferred. Suitable binders may be selected from, for example, ethyl cyanoacrylate, polyacrylic acid, polyurethane (Clear Coat), polytetrafluoroethylene (Teflon-AF), and acrylic binders such as Rohm and Haas Fastrack™ XSR (a composite solution of acrylic polymers, residual monomers, aqua ammonia, and water).

Selecting the proper amount of the binder is critical to forming an adherent coating with the desired properties. If too much binder is employed in the coating composition, the particles may be securely attached to the surface but swamped by the binder to such a degree that they lose their hydrophobic properties. If too little binder is employed, on the other hand, the particles may not be effectively bonded to the substrate. The inventors have carried out a series of experiments, as described in Example 2 below, to identify the optimal range of binder concentrations for the superhydrophobic coating formulation. Advantageously, the binder is present in the coating formulation at a binder concentration of about 0.8 wt. % or less. For example, the binder concentration may range from about 0.1 wt. % to about 0.7 wt. %, or from about 0.1 wt. % to about 0.5 wt. %. The binder concentration may also fall within the range of from about 0.2 wt. % to about 0.4 wt. %. In general, as the size and/or the concentration of particles used in the superhydrophobic coating formulation decreases, the amount of binder required also decreases.

To deposit the coating formulation including the hydrophobic particles, the solvent, and the binder onto a substrate, any of a number of known deposition techniques may be employed, including spray coating, spin coating, or dip coating. Typically, the coating formulation is deposited onto a clear substrate formed of an optically transparent material, such as glass or acrylic, although other substrates may be employed.

After depositing the coating formulation, the solvent may be removed by heating the substrate at a temperature above the boiling point of the solvent. For example, when Fluorinert™ FC-40, which has a boiling point of 165° C. at 1 atm, is employed as the solvent, the substrate may be heated to a temperature in excess of 165° C. to promote solvent evaporation.

As the solvent evaporates, the binder migrates to the interfacial regions between the hydrophobic particles and the substrate by capillary forces. Depending on the type of binder used, curing of the binder may be carried out by simply allowing the solvent to evaporate. Other binders may require heating or radiation (e.g. ultraviolet (UV) radiation curable resins) for curing. Once the solvent has evaporated and the binder has cured, a discontinuous binder layer is formed on the substrate. The discontinuous binder layer includes discrete portions that are localized to the interfacial regions and are substantially absent from other regions of the substrate. These portions that make up the discontinuous binder layer may have a nonuniform thickness as a consequence of the capillary action during solvent removal. Referring again to FIG. 2, the thickness of the discontinuous binder layer 115 may decrease in a direction away from each particle 110. The decrease in thickness may be a nonlinear decrease, as shown schematically in the figure.

The hydrophobic particles are bonded to the substrate at the interfacial regions, thereby forming a transparent superhydrophobic coating on the substrate. The coating process is scalable; a coating rate of at least about 0.1 m²/h (e.g., about 1 m²/h) can be achieved using the method described here. As explained above, the binder type and concentration are carefully selected to ensure effective bonding of the particles without impairing the superhydrophobicity or optical transparency of the resultant coating. The particles are also carefully selected to optimize the properties of the coating.

Suitable hydrophobic particles may be formed from, for example, Nanogel™ aerogel particles manufactured by Cabot Corp. (Boston, Mass.). These porous, nanostructured particles are available in particle sizes ranging from about 5 microns to 4 mm (see Table 1 below), but may be mechanically milled or sonicated as discussed below to obtain particles of reduced sizes (e.g., less than about 50 nm) for use in forming superhydrophobic coatings.

TABLE 1

Characteristics of Nanogel ™ Aerogel Particles

| Characteristic | Value |
| --- | --- |
| Extremely low thermal conductivity | 9-12 mW/mK |
| High porosity | >90% air |
| Nano-sized pores | 20-40 nanometers |
| High surface area | 600-800 m²/g |
| Very low tap density | 30-100 kg/m³ |
| High oil absorption capacity (DBP) | 540 g/100 g |
| Specific heat capacity | 0.7-1.15 kJ/kg |
| Variety of particle sizes | 5 microns-4 mm |
| Surface chemistry | Completely hydrophobic |
| Opacity | Translucent, IR opacified and opaque |

* Characteristics may vary depending on application, temperature and form. Data obtained from Cabot Corp. website (www.cabot-corp.com/nanogel) and Nanogel ™ Fine Particle Aerogel product data sheet.

Other hydrophobic particles that may be suitable for forming the superhydrophobic coatings include oxide particles, e.g., alumina particles, or specially formulated sodium borosilicate glass particles. As described in U.S. Patent Application Publication 2008/0286556, which is hereby incorporated by reference in its entirety, hydrophobic sodium borosilicate particles may be formed in a spinodal decomposition process developed at Oak Ridge National Laboratory. Such particles may have surface asperities on the scale of about 50 to 200 nm. Similar to the silica aerogel particles, the sodium borosilicate glass particles may be milled or sonicated to reduce the particle size, and they may further be chemically etched to remove the borate phase and attain a spinodal texture of porous silica particles with sharp features. These particles may be referred to as spinodal glass particles. It is also contemplated that a combination of two or more types of hydrophobic particles may be employed to form the superhydrophobic coatings. For example, a combination of silica aerogel and sodium borosilicate glass particles may be employed.

The hydrophobic particles may include a silane-modified surface (or a silane coating). A silane or silating agent may be employed to modify the surface energy or wettability of the surface of a particle without imparting chemical reactivity to the surface. The primary types of silanes that may be employed to enhance the hydrophobicity of the particles include methyl, linear alkyl, branched alkyl, aryl and dipodal silanes.

Coatings prepared as described above on glass, acrylic or other substrates may exhibit the following: (1) a water droplet contact angle of about 170° or higher; (2) incident light transmission of about 90% or greater over a wavelength range of 300-1500 nm, and about 95% or greater over a wavelength range of 400-1500 nm; (3) water sliding off the coated substrate at a sliding angle of about 1° or less; (4) ultraviolet radiation (UV) and moisture tolerance (no change in coating after 15 months equivalent UV exposure); and (5) high and low temperature tolerance from −40° C. to 150° C. (tested over 10 cycles; actual tolerance extends from below −196° C. to 200° C.).

EXAMPLE 1

An optically transparent superhydrophobic coating may be formed as described in this example using commercially available silica aerogel powder. First, a coating solution including Nanogel® aerogel powder at a concentration of 0.3 wt. % in Fluorinert™ FC-40 solvent is formed. To reduce the size of the aerogel particles and disperse them in the solution, the particle coating solution is sonicated using a high power ultrasonic probe for at least 20 minutes. The particles in the sonicated particle coating solution have an average particle size of about 200 nm or less. Any particle grains larger than about 200 nm may scatter visible light and cause the coating to become somewhat cloudy. Teflon-AF is then added to the sonicated solution as a binder at a concentration of 0.5 wt. %.

A clean glass slide is coated with the sonicated particle coating solution by spray coating, and the solvent is evaporated in a drying oven at 70° C. As the solvent evaporates, the Teflon-AF binder is concentrated at the interfacial regions between the particles and the glass slide due to capillary effects, and the particles are bound to the glass slide.

Figure 3:
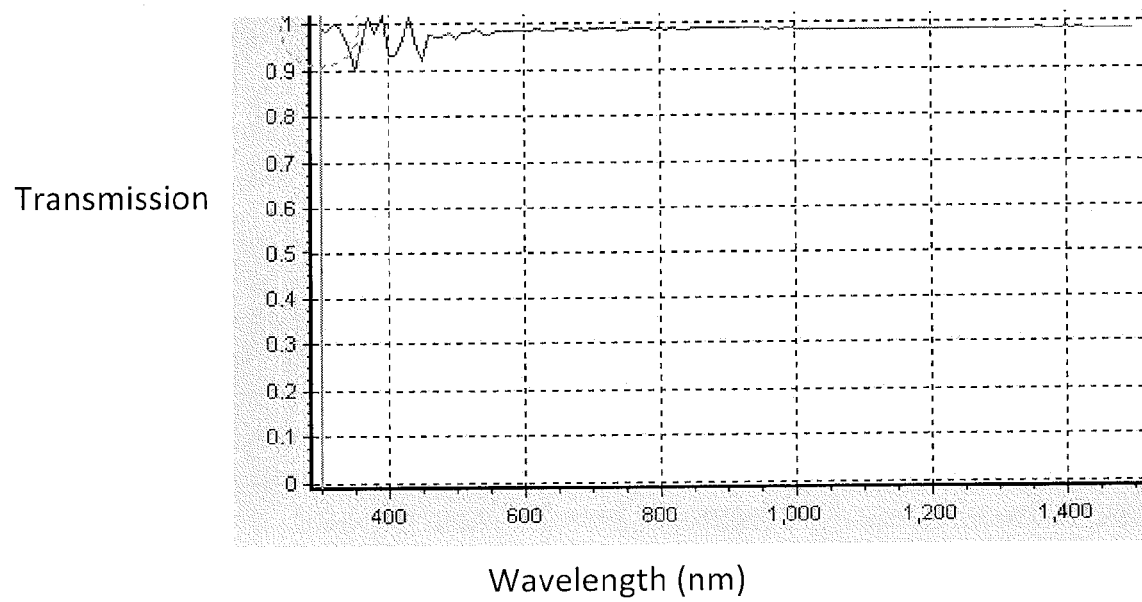
FIG. 3 is a plot showing light transmission versus wavelength for an exemplary coated glass slide.
Figure 4:
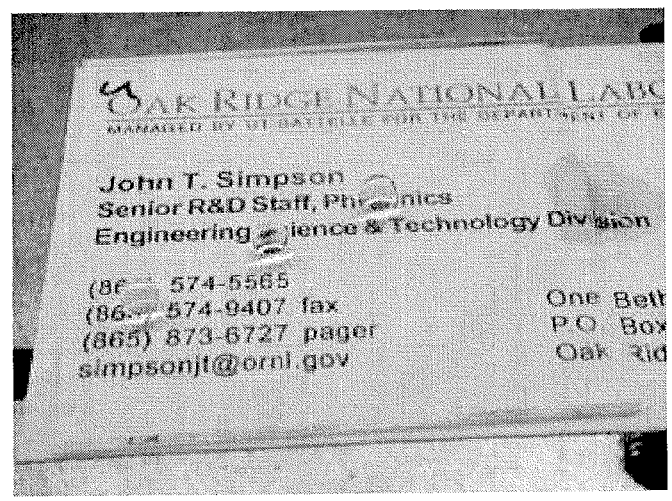
FIG. 4 shows the coated glass slide of FIG. 3 overlying a business card with water droplets beading up on the surface.

The resulting coating proves to be optically clear throughout the visible and near infrared (IR) wavelength regimes and extremely water repellant. Referring to FIG. 3, it can be seen that the coating exhibits greater than 90% transmission throughout the visible and near IR wavelength regimes. It should be noted that the signal-to-noise ratio (SNR) of the detector was poor at low wavelengths, which is the reason for the noise in the data below 500 nm. Wavelengths above 500 nm had a good SNR and showed a transmission of about 98%. FIG. 4 shows the superhydrophobic coated glass slide overlying a business card with water droplets beading up on the surface. Due to the proper selection of the binder concentration and particle size, the binder can effectively bond the particles to the glass slide without masking the nanoscale features of the particles or diminishing their superhydrophobic characteristics.

EXAMPLE 2

The effect of binder concentration on bond strength and superhydrophobicity has been evaluated in a series of experiments in which the binder concentration was varied from 0.1% to 1.0% by 0.1% steps. Teflon-AF was employed as the binder in a coating solution including 0.3 wt. % aerogel particles in Fluorinert FC-40. The coating solution was sonicated for three hours to achieve an average particle size of about 100 nm and good dispersion of the powder in the solvent. The coating solution was applied to a glass substrate by spray coating. Evaporation of the solvent and curing of the binder occurred at room temperature.

The results indicated that the greater the binder percentage, the better the particle bonding, as expected. Bonding strength was evaluated using a simple rub test. Light rubbing caused small amounts of the coating to be removed. Moderate or vigorous rubbing completely removed the coating. It was thus concluded that the binder employed in the experiments, Teflon-AF, did not provide sufficient bonding strength under all conditions.

The water-repellency (superhydrophobicity) of the particle coating stayed very high until the binder concentration reached 0.8 wt. %. At this level and beyond, the amount of binder began to negatively affect the superhydrophobic quality of the coating. The negative effects increased as the binder concentration increased. The amount of binder required is believed to depend on the average particle size of the hydrophobic powder employed, where larger particles are expected to require larger amounts of binder, and smaller particles may require less binder.

EXAMPLE 3

In another set of experiments, the amount of hydrophobic particles required in a coating solution to obtain a well-bonded, superhydrophobic coating having at least 90-95% particle surface coverage has been investigated.

A coating solution including acetone, 0.3% by weight of polyurethane (Clear Coat (CC)) and 0.3% by weight of silica aerogel particles was prepared. The aerogel particles had to be sonicated for five hours to sufficiently reduce the particle size such that a small amount of CC would hold the particles in place on a glass slide. Several different tests were carried out with the solution. The best results in terms of particle size reduction were obtained using an emulsifier at 8000 rpm for 15 minutes and a sonicator for 1 hour. It was found that if the solution of acetone, aerogel particles and the CC binder set for awhile, the coating results were very poor. Therefore, before using any coating solution, the solution was sonicated for a minimum of two minutes. The desired surface coverage could be achieved in several different ways, as summarized in Table 2 below. An entry of "100" in the table designates a superhydrophobic surface, while an entry of "0" designates a non-superhydrophobic surface. The contact angle for the superhydrophobic samples varied between 165° and 175°, and it is believed that the superhydrophobic samples had a particle surface coverage of at least 90-95%. The data show that the superhydrophobicity and the particle surface coverage increased as the amount of aerogel in the coating solution was increased.

The coating solution including 0.3 wt. % aerogel particles could be made to work if the glass slide was dipped into it and allowed to dry, but the dipping and drying had to be repeated at least 5 times to obtain the particle surface coverage needed for the desired superhydrophobicity. In contrast, the coating solution including 0.5 wt. % aerogel particles yielded a coating having sufficient particle surface coverage for superhydrophobicity after a single dip in the solution.

TABLE 2

Achievement of Superhydrophobicity as a Function of Aerogel Particle Concentration in Coating Solution

| | wt. % hydrophobic particles | | | | |
|---|---|---|---|---|---|
| | 0.3 | 0.35 | 0.4 | 0.45 | 0.5 |
| 1 Dip | 0 | 0 | 0 | 0 | 100 |
| 2 Dips | 0 | 0 | 0 | 100 | 100 |
| 3 Dips | 0 | 0 | 100 | 100 | 100 |
| 4 Dips | 0 | 100 | 100 | 100 | 100 |
| 5 Dips | 100 | 100 | 100 | 100 | 100 |

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. An optically transparent, superhydrophobic article comprising:
   an optically transparent substrate;
   a plurality of hydrophobic particles having an average particle size of less than 50 nm dispersed over the optically transparent substrate; and a discontinuous binder layer bonding the plurality of hydrophobic particles to the optically transparent substrate, the plurality of hydrophobic particles and the discontinuous binder layer forming an optically transparent, superhydrophobic coating, wherein the discontinuous binder layer comprises a plurality of discrete binder portions, wherein each of the plurality of discrete binder portions is localized at an interfacial region between one of the plurality of hydrophobic particles and the optically transparent substrate, and wherein each of the discrete binder portions decreases in thickness across the interfacial region in a direction away from each particle.

2. The superhydrophobic article of claim 1, wherein each of the plurality of hydrophobic particles is in direct contact with one or more adjacent hydrophobic particles.

3. The superhydrophobic article of claim 2, wherein the particle surface coverage is at least about 90%.

4. The superhydrophobic article of claim 1, wherein the maximum thickness of the discontinuous binder layer on the optically transparent substrate is less than the average particle size of the plurality of hydrophobic particles.

5. The superhydrophobic article of claim 1, wherein the optically transparent, superhydrophobic coating on the optically transparent substrate transmits at least about 95% of incident light.

6. The superhydrophobic article of claim 1, wherein the optically transparent, superhydrophobic coating on the optically transparent substrate exhibits a water droplet contact angle of at least about 170°.

7. The superhydrophobic article according to claim 1, wherein the optically transparent substrate comprises one selected from the group consisting of a glass, an acrylic, and combinations thereof.

8. A method of making an optically transparent, superhydrophobic article, the method comprising:

depositing a coating formulation onto a optically transparent substrate, the coating formulation including a solvent, a binder, and a plurality of hydrophobic particles comprising an average particle size of about 50 nm or less;

removing the solvent from the optically transparent substrate by capillary forces;

forming a discontinuous layer of the binder on the optically transparent substrate, the binder migrating to interfacial regions between one of plurality of hydrophobic particles and the optically transparent substrate as the solvent is removed to form a plurality of discrete binder portions; and wherein each of the discrete binder portions decreases in the thickness across each of the interfacial regions in a direction away from each particle; and bonding the plurality of hydrophobic particles to the optically transparent substrate at the interfacial regions with the discontinuous layer of the binder, thereby forming a transparent superhydrophobic coating on the optically transparent substrate.

9. The method of claim 8 wherein the binder is present in the coating formulation at a binder concentration of about 0.1 wt. % to about 0.5 wt. %.

10. The method of claim 8 wherein the plurality of hydrophobic particles are present in the coating formulation at a particle concentration from about 0.1 wt. % to about 1 wt. %.

* * * * *